(12) United States Patent
Fouquer

(10) Patent No.: US 7,806,632 B2
(45) Date of Patent: Oct. 5, 2010

(54) CLAMPING ASSEMBLY FOR A CUTTING INSERT

(75) Inventor: Richard Fouquer, Saint Cyr sur Loire (FR)

(73) Assignee: Safety Production, Boulogne Billancourt Cedex (FR)

( * ) Notice: Subject to any disclaimer, the term of this patent is extended or adjusted under 35 U.S.C. 154(b) by 231 days.

(21) Appl. No.: 11/577,286

(22) PCT Filed: Oct. 14, 2005

(86) PCT No.: PCT/FR2005/002549

§ 371 (c)(1),
(2), (4) Date: Feb. 14, 2008

(87) PCT Pub. No.: WO2006/040484

PCT Pub. Date: Apr. 20, 2006

(65) Prior Publication Data

US 2008/0199264 A1 Aug. 21, 2008

(30) Foreign Application Priority Data

Oct. 14, 2004 (FR) .................................. 04 10846

(51) Int. Cl.
 *B23B 27/16* (2006.01)
 *B23B 27/00* (2006.01)
(52) U.S. Cl. ...................................... 407/105; 407/104
(58) Field of Classification Search .................. 407/103, 407/104, 105, 113, 94, 41
 See application file for complete search history.

(56) References Cited

U.S. PATENT DOCUMENTS

| 3,488,822 | A | * | 1/1970 | Jones | 407/105 |
| 3,525,136 | A | * | 8/1970 | Crosby | 407/105 |
| 4,397,592 | A | * | 8/1983 | Erickson | 407/105 |
| 4,427,322 | A | | 1/1984 | Kröll | |
| 4,875,812 | A | * | 10/1989 | Haque et al. | 407/104 |
| 5,199,828 | A | * | 4/1993 | Forsberg et al. | 407/104 |

(Continued)

FOREIGN PATENT DOCUMENTS

EP 0037554 A1 10/1981

(Continued)

OTHER PUBLICATIONS

Schnellwechsel-Spannsystem für das Gewindedrehen; 1 page; XP000593949. Translation provided on separate sheet (1 page).

(Continued)

*Primary Examiner*—Will Fridie, Jr.
(74) *Attorney, Agent, or Firm*—Hodgson Russ LLP

(57) ABSTRACT

The clamping assembly includes a cutting insert with a lower passage housing a screw with a head for clamping the cutting insert against a bearing surface provided on a tool holder and comprising a screwing hole, wherein the screw head is shaped and arranged so as to press only on one side, with a flared opening, of the screw hole, the passage has a template incompatible with a template of the head in the clamping position, and, outside of the clamping, the cutting insert and the screw can change mutually relative positions so as to harmonize the two templates and thus release the cutting insert without having to entirely unscrew the screw.

17 Claims, 5 Drawing Sheets

U.S. PATENT DOCUMENTS 5,938,377 A * 8/1999 Jordberg et al. ............. 407/104

FOREIGN PATENT DOCUMENTS

| EP | 0052585 | A2 | 5/1982 |
| EP | 0247011 | A2 | 11/1987 |
| SU | 1143518 | A | 3/1985 |

OTHER PUBLICATIONS

Yoshioka; Patent Abstracts of Japan; Throw-Away Type End Mill And Throw-Away Tip; Publication No. 11000813; Publication date Jan. 6, 1999; 1 page.

* cited by examiner

CLAMPING ASSEMBLY FOR A CUTTING INSERT

FIELD OF THE INVENTION

This invention relates to the clamping of a cutting insert on a bearing surface provided on a tool holder.

DESCRIPTION OF RELATED ART

Conventionally, a milling cutter comprises a housing with a threaded hole in the base surface, receiving a screw passing through a smooth-sided passage extending in the thickness direction of the cutting insert. As the fit must be relatively strong in order to resist the vibrations which would cause an unscrewing, the hole is relatively deep and has a relatively small thread step so as to have a thread slope that is also very small. In this way, the matching surfaces of the screw threads and of the hole are almost turned in an axial direction, so that any parasitic axial force is exerted substantially perpendicularly on the threads and, as the wedge effect is thus minimal, the screw does not have a tendency to become unscrewed.

Therefore, each time the cutting insert is changed, the user must carry out a large number of unscrewing rotations, in order to release the worn-out cutting insert, by totally unscrewing the screw, and then carrying out the reverse operation. This involves a loss of time, and, in addition, there is a risk that the user will incorrectly position the cutting insert or the screw, which generally leads to the destruction of the cutting insert and sometimes of the tool holder.

The applicant has also identified two other problems, said problems being heat-related. These two problems are associated with maintaining the clamping by the screw, due to the fact that, in use, the heating of the cutting insert clearly expands the screw, which is made of steel, more than it expands the cutting insert, which is made of carbide. A first heat-related problem is associated with the fact that the head of the screw moves up, by an axial expansion with respect to its body held in the hole, and this can affect the contact of the cutting insert against the base surface of the housing. The applicant has also identified a second heat-related problem by observing that, in the subsequent cooling, the screw returned to a position corresponding to a slight additional screwing, and that the increase in pressure, by the conical under-portion of the screw head on the periphery of the hole having the same shape, would cause, over the course of such repeated heat cycles, a cracking of the cutting insert, starting from the hole moving out in a radial direction.

This invention is intended to provide a solution, or to at least attenuate the disadvantages related to at least one of the three problems mentioned above.

SUMMARY OF THE INVENTION

To this end, the present invention relates first to a clamping assembly comprising a cutting insert and a device for clamping the cutting insert on a bearing surface provided on a tool holder. The device for clamping the cutting insert comprises a slide including a guide segment intended to be slidably mounted in a guide hole provided in the bearing surface, and a clamping segment including a clamping head comprising a lateral clamping relief with a shape arranged for having a clamping contact surface, at least partially turned toward the guide segment, so as to abut an opposite seat surface, associated with a cavity in the cutting insert, leading to at least one bearing face of the cutting insert, and arranged so as to house the clamping segment, so as to clamp the cutting insert against the bearing surface when the cutting insert and the slide are mutually arranged in a mutually relative clamping position. The clamping assembly is characterized by the fact that the cavity of the cutting insert has a passage template, along an access passage for the head from the bearing face to the seat surface, the seat surface being associated exclusively with one side of the cavity, wherein the passage template varies according to a suitable shape, with respect to a bulk template of the lateral clamping relief, so that the passage template is incompatible with the bulk template when the cutting insert and the slide are arranged in said mutually relative clamping position, and said suitable shape being so that the passage template is compatible with the bulk template when the cutting insert and the slide are arranged in at least one other mutually relative position, for releasing the cutting insert.

Thus, when the cutting insert is clamped against the bearing surface in a fitted position determined by said relative position, and the head of the slide is therefore held in the cavity of the cutting insert, it is in fact the bearing surface that maintains the desired relative position. Indeed, the cutting insert has, with the bearing surface, a certain coefficient of friction and/or is adapted to a lateral wall limiting a housing. For clamping, the single bearing contact exerted on said side of the cavity is therefore sufficient. Any side surface of the cavity, laterally opposite the seat surface, remains totally free, and the same is true of any side surface of the clamping head, opposite the lateral clamping relief. Therefore, the cutting insert is simply pinched between the jaws constituted by the lateral clamping relief and the base surface of the housing, i.e. it is subjected only to a pressure stress. The through hole of the cutting insert is therefore not subjected to tearing stresses, which would crack the wall thereof.

When the slide is forced to move up so as to unclamp the cutting insert, the cutting insert is therefore released from the bearing surface and can thus change its relative position with respect to the slide, so as to adopt the release position, releasing the head of the slide and thus releasing the cutting insert. Depending on the embodiment, one of the two elements, either the cutting insert or the slide, automatically adopts the desired relative orientation with respect to the other for automatic detachment, or the user intervenes. In every case, it is therefore unnecessary to totally disassemble the slide from the tool.

The cavity can also lead to an upper face, opposite the bearing face, so as to provide an upper passage, for access to the clamping head by a screwdriver or a maneuvering key, if the clamping head also constitutes a driving head. Depending on the case, the upper passage makes it possible to pass the guide segment, for a classic assembly operation. The cavity can in particular be functionally symmetrical so that the cutting insert is top-bottom reversible.

In a specific embodiment, the passage template and the bulk template are arranged so that said other mutually relative position is reached by tilting the cutting insert with respect to the slide.

There is therefore a relative tilting, i.e. the cutting insert can tilt with respect to the bearing surface, and the slide can then keep, in the raised unclamping position, the orientation that it had in the clamping position, or the cutting insert can keep its orientation parallel to the bearing surface, and then the slide, when it partially moves up out of the guide hole, rotates, like a screw, about a geometric axis, so as to release its lateral clamping relief with respect to the clamping contact surface, by said rotation of a certain angle. Alternatively, the guide hole and the slide may extend in an arc of a circle, so that the overall orientation of the slide tilts when it rises, and thus the lateral clamping relief can be arranged so that it tilts in such a way that it tends to be aligned with the direction of extension of the passage, so as to become compatible with it.

In another embodiment, the passage template and the bulk template are arranged so that said other mutually relative position is achieved by a relative rotation of the cutting insert, with respect to the slide, in a plane substantially parallel to the bearing surface.

The lateral relief of the head therefore has a non-circular bulk template, from a top view parallel to the bearing surface, and the aforementioned rotation of the cutting insert suppresses its registration with the bearing surface, so as to establish another fit, in which the bulk template is compatible with the passage template.

In such a case, a lateral relief for driving the slide, and a complementary relief of the tool holder can be arranged so that, by a partial lifting of the slide by at least a height determined with respect to the guide hole, the slide pivots over itself by a certain angle that brings the bulk template to an orientation making it compatible with the passage template.

In such a case, the slide has a rectilinear guide segment, for example of the screw type, so as to be capable of rotating axially.

In yet another embodiment, the passage template and the bulk template are arranged so that said release position is reached by a movement of the cutting insert with respect to the slide, in a plane parallel to the bearing surface.

The passage therefore comprises, opposite a side comprising the seat surface, a recess for housing the head, so that a radial backward movement of the seat surface is then possible, over a sufficient distance to move out of the grip, i.e. the overhang, of the lateral relief bearing the clamping contact surface. As the "attachment", or bearing, of the clamping contact surface on the seat surface is thus suppressed, it is easy to design the passage template in order to allow the head to exit and, of course, to put in place a new cutting insert which is similarly oriented.

It is possible in particular to consider such a passage, which would be bent, comprising a "vertical" opening segment leading to a cavity in the shape of a "horizontal" tunnel at a certain level in the thickness of the cutting insert. Once mounted in the cavity, by an axial movement in the opening segment, the head of the slide can be pushed back laterally towards an end wall of the tunnel, due to the fact that the opening segment comprises a narrow lateral slot, allowing the passage, by a radial movement, of a neck bearing the head, but preventing any downward return of the head. The horizontal tunnel and the slot located below thus have a general dovetail cross-section, with the horizontal tunnel having a lower edge constituting an internal track of said seat, receiving the bottom of the head of the slide.

The guide hole can generally have an oblique direction of extension with respect to a normal to the bearing surface, with the clamping segment capable of having the same orientation or a different one.

In order to distribute the load, the seat surface preferably extends over a partial peripheral arc of the passage of the cavity, not exceeding 180 degrees so as to give the clamping head an unlimited freedom to bend. The blocking bearing on such an arc can be provided on a single area or can be distributed over a plurality of separate areas, for example two bearing areas mutually offset by 90 degrees so as to best secure the cutting insert in the corresponding directions. However, if the cutting insert comprises a plurality of cutting edges and can therefore be mounted according to a plurality of azimuthal orientations, the seat surface can be provided in a same plurality of distributed sectors, or the seat surface can even constitute a track surrounding the entire cavity, with the understanding that, according to the invention, only a single sector is functional for each position offered. In consideration of the fact that, according to the invention, there is no need to have a counter-bracing area on the cutting insert, which would be laterally opposite the seat surface and would have a specific shape for this purpose, it is therefore possible for such an opposing area, functionally free when the cutting insert is clamped in a given azimuthal position, to have a shape that serves as a seat surface when the cutting insert is mounted according to another azimuthal orientation.

The passage template can thus be arranged so that the head is released by moving, according to a relative movement, the clamping contact surface toward a side opposite said arc, so that the clamping contact surface no longer overhangs the seat surface, which holds the head, said relative movement being a radial movement with respect to the passage or being a relative tilting of the cutting insert, wherein the respective templates are then compatible.

In an advantageous embodiment, the guide hole is formed in an oblique direction of extension toward an extension area of a lateral wall limiting the bearing surface.

The cutting insert can thus be clamped between, on the one hand, a stationary edge line defined by the bottom of the lateral wall thus defining a housing and, on the other hand, the clamping contact surface belonging to the slide, which therefore constitutes a jaw opposite the stationary edge. As the plane of the lateral wall and the direction of extension of the guide hole form a V shape, a slight unclamping of the cutting insert enables it to move up on a branch of the V shape defined by the slide, so that the cutting insert, thus released from the contact with the lateral wall, can thus adopt the desired orientation so as to be released, by a movement, by a rotation or by tilting. It is to be noted that the aforementioned V-shape does not involve the base of the housing, i.e. it is possible for the plane of the lateral wall to be inclined on a normal to the base, or bottom, of the housing, with the direction of extension of the through-hole being oblique or being parallel to such a normal to the base.

In such a case, the lateral wall can extend in a generally oblique, flared manner with respect to a normal to the bearing surface.

The lateral wall can have a rectilinear, or curved or even layered rising profile.

In a specific embodiment, the guide hole and the slide extend in an arc of a circle.

Insofar as the guide hole and the slide have mutually adjusted transverse cross-sections, the slide has exclusively a sliding movement with a tilting of its general orientation, which tilting can be performed according to an angle allowing for the desired adaptation between the two associated templates.

The passage template can comprise a constriction segment. The passage can thus, for example, comprise two opposite conical opening, or mouth, segments, opening outward, and the seat surface is located on one of the conical surfaces constituting slopes of the constriction, or, even, the seat surface is provided twice, by providing two said surfaces on two respective slopes, if the cutting insert is reversible.

The guide segment can comprise drive control means, i.e. for maneuvering the slide.

Said drive control means can, for example, be an end portion, slotted or sided, of a screw constituting the slide, which end portion is opposite the head; i.e. the guide hole is a through-hole, for an axial or a lateral access to the drive control end portion.

The guide segment advantageously comprises a lateral relief, for locking the slide in the clamping position, said lateral relief being arranged so as to cooperate with a complementary relief of the tool holder.

Such a lateral relief can easily be coupled to a drive gear for driving an axial relief of the slide.

The lateral relief for locking the slide in the clamping position is, for example, a lateral notch arranged to receive an end portion, for maneuvering control and position locking, of a maneuvering screw mounted in a threaded hole and arranged to push the slide into the guide hole, by pushing a flank of the notch.

The maneuvering screw can have an inclined direction of extension with respect to a direction of extension of the through-hole; however, this condition is not necessary insofar as, in use, the slide does not need to entirely leave the guide hole. It is therefore possible for the threaded hole, for the maneuvering screw, to have an axis parallel to the direction of extension of the guide hole for the slide. For example, the maneuvering screw can have an end segment, in principle smooth, separated from the rest of the screw by a diametrically extending, or annular, groove or by a simple lateral notch, the slide having the same type of shape so that its end segment can be housed in the groove of the screw, while the end segment of the maneuvering screw is itself housed in the groove of the slide. In other words, and more generally, the maneuvering screw may be thought of as a rack engaged with a lateral relief of the slide. To allow the maneuver, the guide segment of the slide is axially smooth, i.e. it does not engage with the wall of the guide hole. The slide and the screw are thus laterally coupled in opposite orientations, head-to-tail; the maneuvering screw thus may be thought of as a kind of a serrated wheel engaged with one flank or another of the notch, or engaged with an entire segment of the slide threaded for this purpose, with the threads of said slide thus providing a plurality of such notches.

The clamping contact surface and the seat surface are advantageously two respective ramps provided for a mutual sliding during the sliding of the slide entering the guide hole, so that a free segment of the slide, bearing the clamping head, is bent back and received in a lateral recess of the cavity, provided for this purpose on a side opposite to the seat surface.

The cavity advantageously forms, with the lateral recess, a housing having a width of at least 1.25 times, preferably 1.5 times, and more preferably 2 times, a width value of the clamping head.

Advantageously, to ensure a substantially constant clamping force when the cutting insert is heated by friction on a working piece being machined, the clamping contact surface and the seat surface forming a ramp are oriented, in the clamping position, in a direction cutting a virtual longitudinal axis of the slide at an axial point located substantially in a virtual radial surface of the apex of the guide segment, bearing the clamping head.

As the guide segment is locked in the guide hole, the natural isotropic extension of the clamping head occurs according to a similar transformation originating at said axial point. The two ramps are therefore aligned with the local direction of volume extension, so that they slide over each other without tending to separate or press on one another excessively.

The invention also relates to a cutting insert for a clamping assembly according to the invention, comprising a seat surface, arranged to receive a clamping contact surface of a slide. The clamping contact surface may be associated with a cavity leading to at least one bearing face of the cutting insert and arranged so as to house a head segment, for clamping the cutting insert, belonging to the slide, characterized by the fact that the cavity of the cutting insert has a passage template, along an access passage for the head from the bearing face to the seat surface. The seat surface may be arranged so that, in use, it is associated exclusively with a single side of the cavity, with the passage template varying according to an adapted shape so as to enable the clamping contact surface of the slide to move away from the bearing surface and thus to release the slide.

BRIEF DESCRIPTION OF THE DRAWINGS

This invention can be better understood from the following description of an embodiment of a tool holder with a cutting insert clamping device according to the invention, in reference to the appended drawing, in which.

DESCRIPTION OF THE PREFERRED EMBODIMENT

Figure 1:
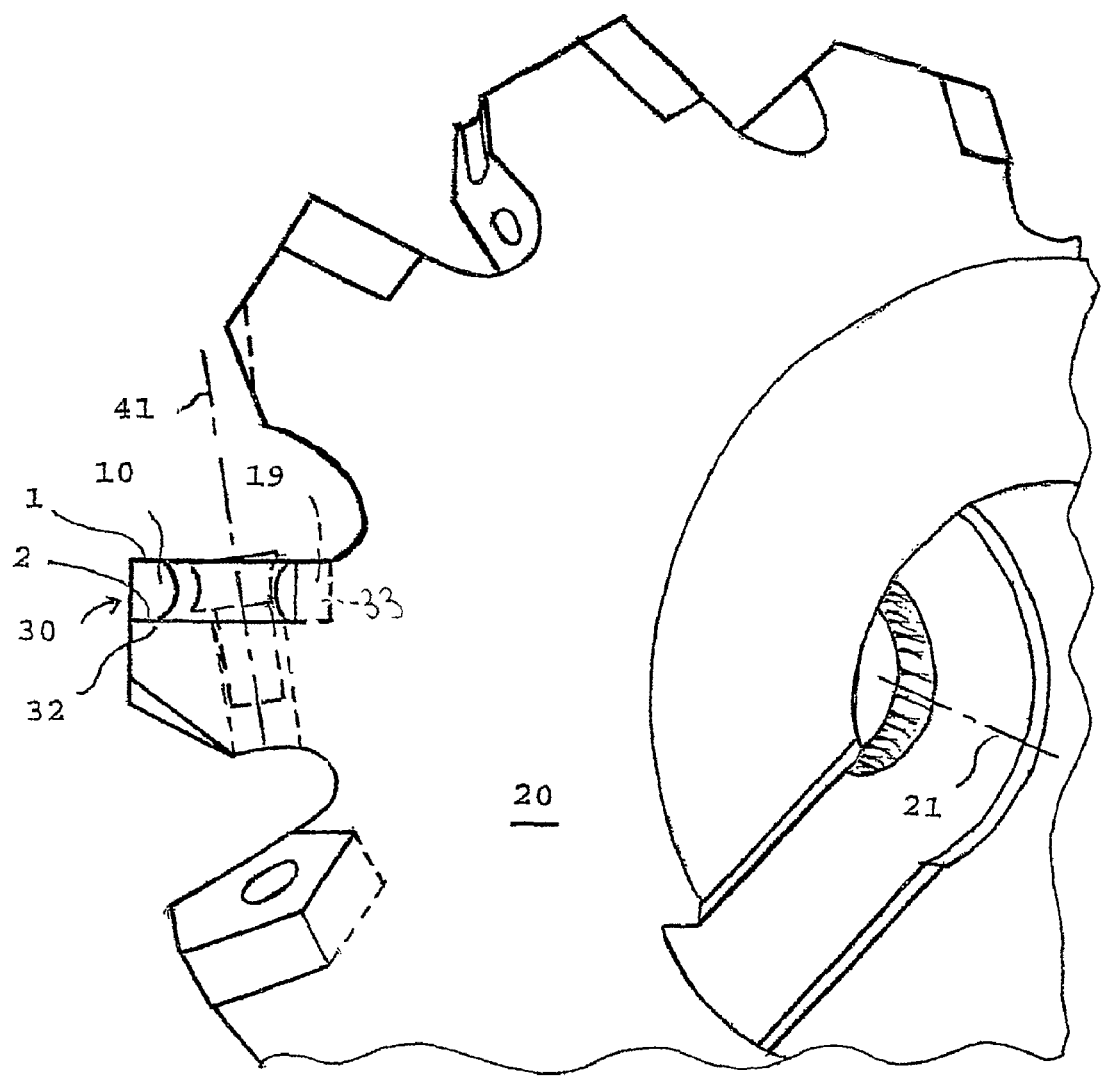
FIG. 1 is a partial perspective view of a milling cutter which provides a tool holder according to the invention and a plurality of housings for cutting inserts.

FIG. 1 shows a portion of a milling cutter 20 with a general rotation axis 21 in the shape of a crown, in this case seen obliquely from behind, comprising, at a top end, a plurality of teeth each having a housing 30 with a substantially planar base surface 32 extending in a substantially axial and radial plane with respect to the general axis 21. Each base surface 32 serves as a bearing surface for a lower main face 2 of a cutting insert 10 opposite to a substantially parallel upper main face 1. The main faces 1 and 2 are connected by a plurality, in this case five, of lateral flank surfaces, in this case identical, such as, for example, the lateral flank surface 19, defining, with at least one of the main faces 1 and 2, the same number of cutting edges, which can be used successively.

Figure 2:
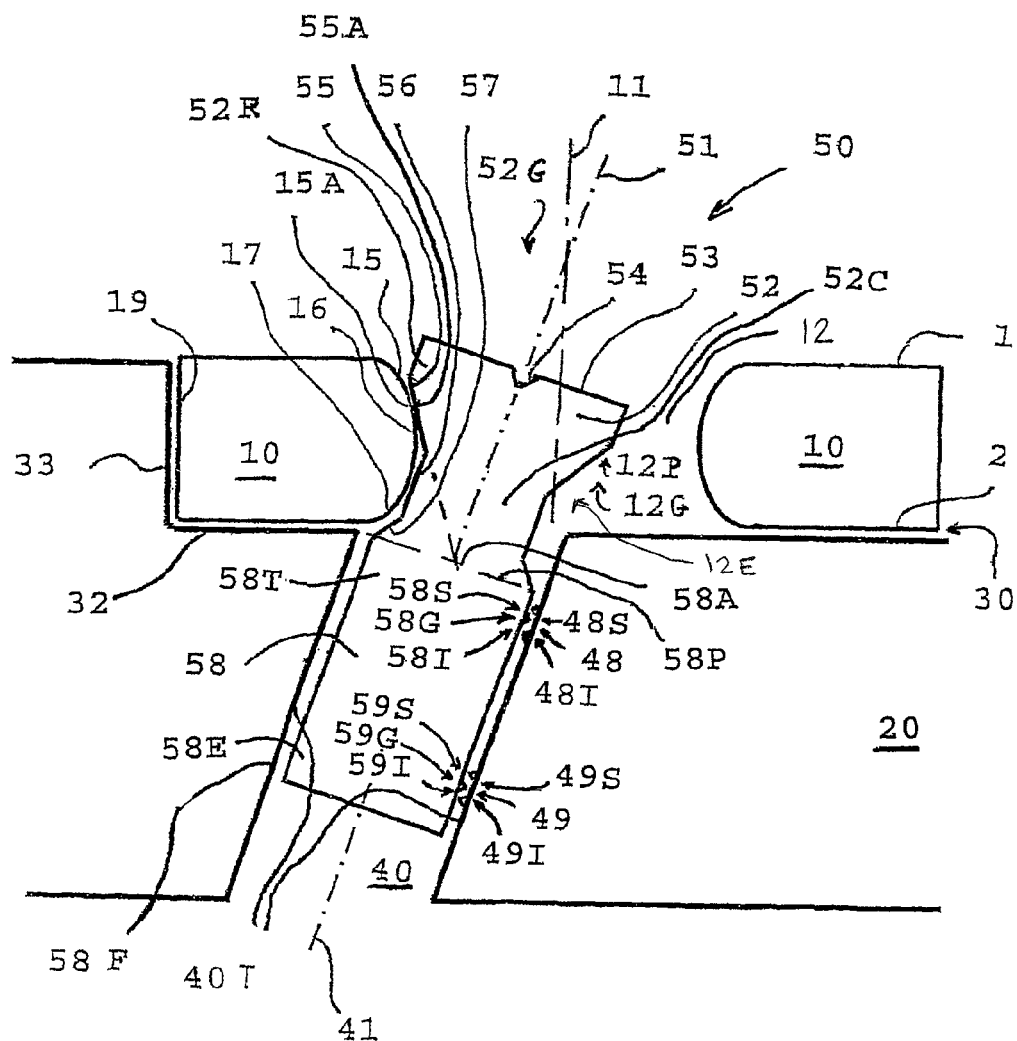
FIG. 2 is a cross-section view along the thickness direction of one of the housings, showing a cutting insert held in a clamping position by a clamping screw.

FIG. 2 is a view according to a cross-section of one of the housings 30, in a radial plane of the cutter 20, showing the corresponding cutting insert 10 and an associated clamping slide, which in this case is a clamping screw 50 with a geometric axis 51, housed in a threaded guide hole 40 formed in the base surface 32 and with a geometric guide axis 41, in this case merging with the screw axis 51.

The clamping screw 50 comprises, in succession, (a) a clamping head 52, in this case a cylindrical one having with a lateral peripheral clamping relief 52R, with an apex surface 53 comprising a diametral maneuvering slot 54, then (b) a neck 52C forming a groove constituted by an upper flank 55 forming a substantially frusto-conical bottom of the peripheral relief 52R, a cylindrical groove base segment 56 and a lower, substantially frusto-conical, flank 57, and finally (c) a guide body segment 58, with a thread 58F. The clamping screw 50 is housed in the guide hole 40 and engaged with a thread 40T thereof. The lower flank 57 is symmetrical with the upper flank 55 with respect to a median plane located at a half-thickness level of the cutting insert 10, so as to be capable also of mounting the cutting insert 10 in an overturned position. The lower flank 57 is not functional in the position shown; i.e., for a cutting insert 10 which would not be reversible, the lower flank 57 could be replaced by a conical segment, according to an angle of any value and sign, or by a non-conical segment, serving to superelevate the clamping head 52.

For the simplicity of the description below, the guide segment 58 is considered to be constituted by two threaded segments, namely a, lower, free end segment 58E, opposite to an upper segment 58T limited by an upper virtual radial plane 58P constituting the limit with the neck 52C and comprising an axial point 58A, located on the screw axis 51.

Reference 58G designates, on the threaded surface 58F, an apex thread, in the upper axial position, of the upper segment 58T, having an upper flank 58S, i.e. turned somewhat toward the clamping head 52, and a lower flank 58I, turned somewhat toward the free end segment 58E. References 59G, 59S and 59I similarly, but generally, designate threads, not all shown, of the free end segment 58E and two flanks, upper and lower, respectively, thereof. The threads 59G however occupy any axial position on the free end segment 58E. Cooperating with the threads 58G and 59G, respectively, the thread 40T similarly comprises an apex helical groove 48 and helical grooves 49, with respective upper flanks 48S and 49S, turned somewhat away from the housing 30, and respective lower flanks 48I, 49I axially opposite the associated upper flank 48S, 49S.

In this example, the guide axis 41 extends obliquely, in this case by around 10 degrees, with respect to a normal to the base surface 32. The base surface 32 is, in this case, associated with a lateral wall 33, in this case perpendicular to the base surface 32, for a more precise and more stable fixing in the desired position for the cutting insert 10 on the base surface 32. The guide hole 40 descends in an oblique direction toward a region of extension of the lateral wall 33, thus forming a V shape with said lateral wall 33.

As shown in FIG. 1, the guide axis 41 extends substantially in a circumferential direction with respect to the general axis 21, the clamping head 52 being somewhat turned away from the general axis 21, i.e. somewhat toward the opening of a groove between two of the teeth, which groove is therefore open radially toward the outside, limited by a front surface of the tooth in question, i.e. limited by the upper main face 1 (or the base surface 32), and by the back surface of a preceding tooth, with the rotation occurring in the clockwise direction. In this way, the extension of the guide axis 41 is better offset from the back portion of the preceding tooth, so that a screwdriver can easily access the maneuvering slot 54. The chamfer also has a groove, or notch, having the shape of a cylinder portion along the guide axis 41, serving as a cradle for the screwdriver.

The cutting insert 10 comprises a cavity 12 forming a passage 12P having a geometric passage axis 11, in this case substantially perpendicular to extension planes of the main faces 1 and 2, the passage 12P, in this case, mutually connecting the upper and lower main faces 1 and 2, and leading to a central area thereof. The passage 12P, in this case, has a shape according to a passage template 12G of the same type as a bulk template 52G presented by the clamping head 52 together with the upper flank 55, i.e. an upper opening, segment with a substantially frusto-conical upper flank wall 15, then an intermediate constriction segment, with a substantially cylindrical wall 16, and a lower opening, or mouth, segment, with a substantially frusto-conical lower flank wall 17. The term "template" thus designates the shape and the size of a transverse cross-section of the passage 12P as well as of the clamping screw 50, and also designates the change of these shapes and sizes along the corresponding axis 11 or 51, and also in consideration of the relative position imposed between these two elements, depending in particular on the inclination and the mutual positions between these axes.

As shown in FIG. 2, the passage 12P is located in the cutting insert 10, so that when the lateral flank surface 19, for example, is in contact with the lateral wall 33, the upper flank wall 15, partially turned toward the upper opening, constitutes a lateral abutment relief preventing the clamping head 52 from penetrating further into the hole 40, so as to thus clamp the cutting insert 10. Specifically, a seat surface 15A, belonging to the upper flank wall 15 and located beside the lateral wall 33, serves as a seat for a clamping contact area 55A belonging to the upper flank 55, of the clamping screw 50, partially turned toward the body segment 58. The base surface 32 and the lateral wall 33 thus delimit a corner edge line which, with regard to the left half of the cutting insert 10, is substantially diagonally opposite the clamping contact area 55A which is capable of moving toward the base surface 32. The clamping contact area 55A represents an area of current contact when the clamping screw 50 rotates, i.e. the other part of the upper flank 55 constitutes a plurality of such clamping contact areas, which are "eligible" in mutually exclusive manner, i.e. which will, during the screwing, successively replace the current clamping contact area 55A. The clamping of the cutting insert 10 is thus ensured, with the threaded surface 58F and the threaded surface 40T serving to guide the clamping screw 50 and, by friction with the thread 58F, to hold the cutting insert 10 in the clamped position.

It should be noted that, if the guide axis 41 were perpendicular to the base surface 32, i.e. if the screw head 52 did not move laterally, by the screwing, toward the seat surface 15A, in this case to the left, the cutting insert 10 should therefore occupy, from the beginning of the screwing, a laterally offset position toward the seat surface 15A, so that the entire periphery of the upper flank 55 does not abut, during the screwing, the entire periphery of the upper flank wall 15. The passage axis 11 should then, in the functional position of the cutting insert 10, occupy a laterally offset position with respect to the guide axis 41, as shown by FIG. 2 in the case of oblique axes.

FIG. 2 shows that, on the side opposite the seat surface 15A, therefore, in this case, to the right, the cavity 12 provides a significant radial clearance with respect to the clamping head 52. This means that, with respect to the cavity volume reserved for the clamping head 52 when it is in a light contact and clamping position on the seat surface 15A, without any bending constraint of the clamping head 52, the cavity 12 comprises a recess 12E located radially opposite the seat surface 15A, and therefore also opposite the clamping contact area 55A, so as to provide a bending volume for bending the clamping head 52 when it comes down onto the seat surface 15A.

In the case of a lateral wall 33, which, in a top view of the housing 30, would have not one but two mutually inclined lateral faces delimiting a vertical corner edge of the base surface 32, in order to better fit the cutting insert 10, the guide axis 41 would preferably be directed downward substantially toward an extension of this vertical edge, so as to have clamping force components toward the two lateral surfaces.

Alternatively, the cavity 12 is in the oblique direction of extension with respect to a normal to the lower main bearing face 2, with the passage axis 11 merging, for example, with the guide axis 41. In a similar case, the passage template 12G can be distorted with respect to this embodiment so that the seat surface 15A forms a frusto-conical band entirely surrounding the cavity 12.

Figure 3:
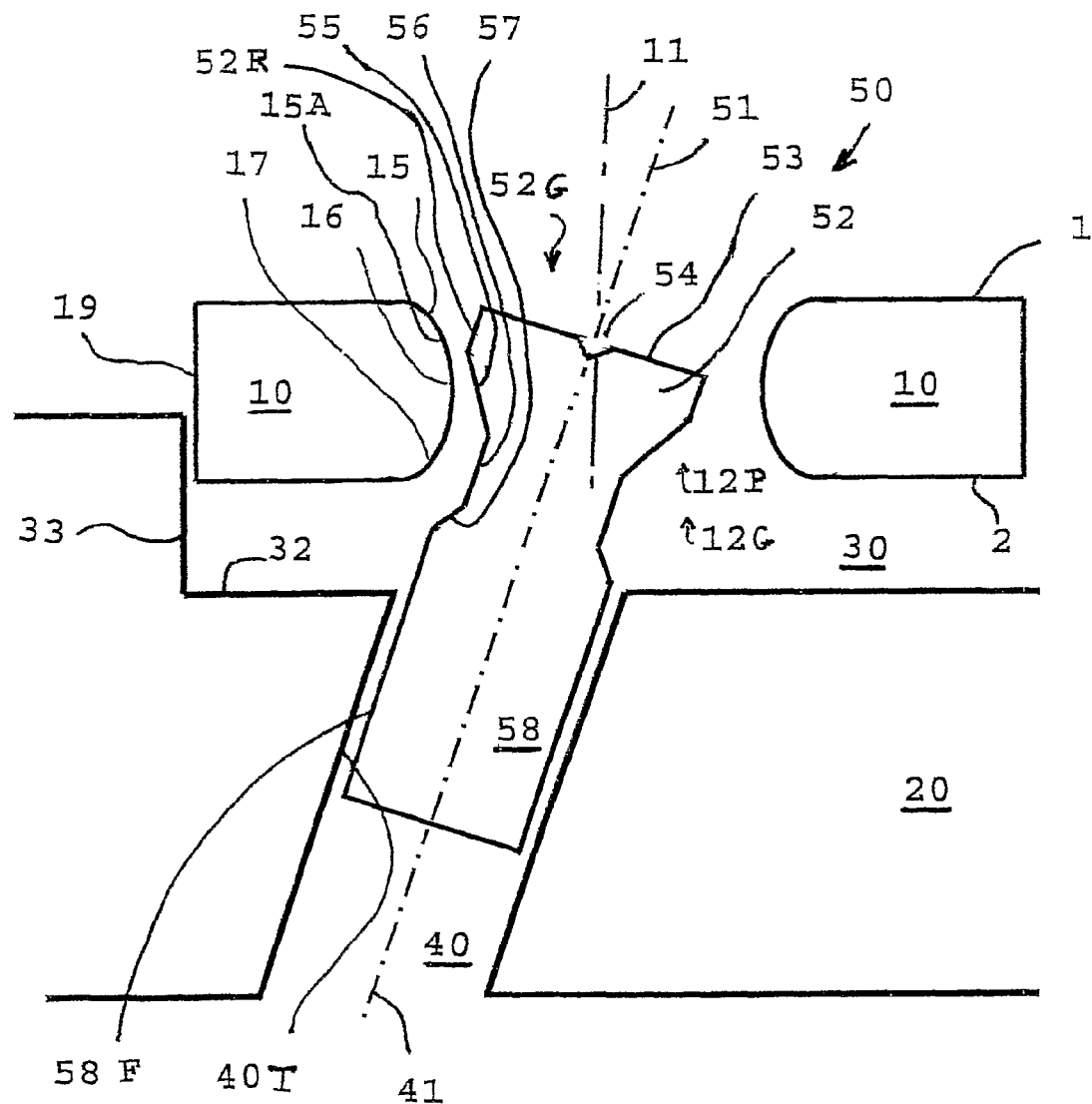
FIG. 3 is similar to FIG. 2, with the cutting insert shown unclamped.

FIG. 3 shows the unclamped position of the cutting insert 10. The clamping screw 50 has been partially unscrewed from the guide hole 40, over a given length, so that the cutting insert 10 can be manually lifted by the same length. This lifting of the clamping head 52, along the oblique branch of the V shape represented by the guide axis 41, therefore separates the clamping head 52 from the lateral wall 33, and this loosening of the upper flank 55 makes it possible to totally free the upper flank 55, i.e. also free the seat surface 15A corresponding to the clamping position. In the manual lifting of the cutting insert 10 accompanying the clamping screw 50, for example by maintaining a lateral rest contact on the lateral wall 33, the clamping contact of the cutting insert 10 with the clamping contact area 55A slides from the seat surface 15A toward the cylindrical wall 16 constituting a constriction of the passage 12P. When, with respect to the lateral wall 33, the upper flank 55 is separated by at least a distance existing between the left edge of the cylindrical wall 16 and the lateral wall 19, in contact with the lateral wall 33, the cutting insert 10 can therefore continue its upward sliding movement on the lateral wall 33, and thus be totally disengaged, since the upper flank 55 no longer overhangs at all the upper flank wall 15 comprising the seat surface 15A.

As shown in FIG. 3, the passage template is such that the right, inactive, edge of the cylindrical wall segment 16 is sufficiently separated from the left, active, edge, that the right edge of the apex surface 53 of the clamping head 52 is located inside the passage template thus defined, and therefore allows for the desired release. Indeed, as the clamping head 52 is in this case cylindrical, therefore with a rectangular axial cross-section, and with a screw axis 51 inclined on the passage axis 11, the clamping head 52, thus arranged crosswise, tilted, has, with respect to a rising movement, in this case vertical, of the cutting insert 10, a bulk template 52G greater than that corresponding to a circle according to its diameter, which template 52G in this case substantially reaches the value of a diagonal of the aforementioned rectangle. However, to limit the width necessary for the cylindrical wall segment 16, the cutting insert 10 can be caused to tilt so as to orient the passage axis 11 substantially according to the axis 51. This tilting is possible as soon as the cutting insert 10 is, as shown, almost outside of the housing 30, since there is then a clearance with respect to the clamping screw 50. Alternatively, it is possible for the lateral wall 33 to be not perpendicular at the base 32, but flared so as to allow for such a pivoting movement.

As shown in the drawing, the cavity 12 is not, in this case, a blind hole but is also open at the upper main face 1 so that a maneuvering screwdriver can access the maneuvering slot 54 of the clamping screw 50 by an upper passage, which even allows for the passage of the clamping head 52. In fact, as shown, the passage axis 11 passes through a center area of the upper 1 and lower 2 main faces, and the cavity 12 has a symmetrical shape with respect to said median plane, so that the cutting insert 10 is reversible and thus provides ten cutting edges, since the so-called upper main face 1 can become a bearing face and thereby cutting edges limiting the lower face 2 can be used for cutting operations.

Preferably, as in this case, the upper flank 55 is only partially turned toward the guide segment 58 to thus form a ramp suitable for sliding on the seat surface 15A, axially opposite the direction of movement, according to the axes 41, 51, of the clamping screw 50, and the clamping screw 50 is elastically flexible so as to thus, as it goes down in the passage 12P, store potential bending energy provided in reaction, by a wedge effect, by the seat surface 15A forming a ramp. As the clamping screw 50 bends towards the side opposite that comprising the clamping contact area 55A, and as this opposite side is, according to the invention, non-functional with regard to the clamping, it is therefore easy to design the complementary side of the cavity 12, laterally opposite the seat surface 15A, at a relatively long distance from the non-functional side of the clamping screw 50, to thus leave a large lateral space for the aforementioned bending of the clamping head 52 and the neck 52C, overhanging the guide hole 40. In consideration of this possibility of obtaining a significant bend in the neck 52C, the clamping screw 50 can be chosen from more flexible material than in the prior art, so that, even if the clamping screw 50 is pressed down with a force slightly lower or greater than that specified, it will still perform its clamping function, without respectively a risk of loosening or a risk of transmitting excessive stress to the cutting insert 10 and to the milling cutter 20 that could damage them.

Thus, the clamping contact surface 55A and the seat surface 15A are each two ramps provided for mutual sliding during the sliding of the clamping screw 50 entering the guide hole 40, so that the neck 52C is bent back and thus the clamping head 52 is received in the lateral recess 12E of the cavity 12, provided for this purpose on the side opposite the seat surface 15A.

The cavity 12 forms, with the lateral recess 12E, a housing having a width at least 1.25 times, preferably 1.5 times and, even more preferably 2 times the width of the clamping head 52.

Figure 4A:
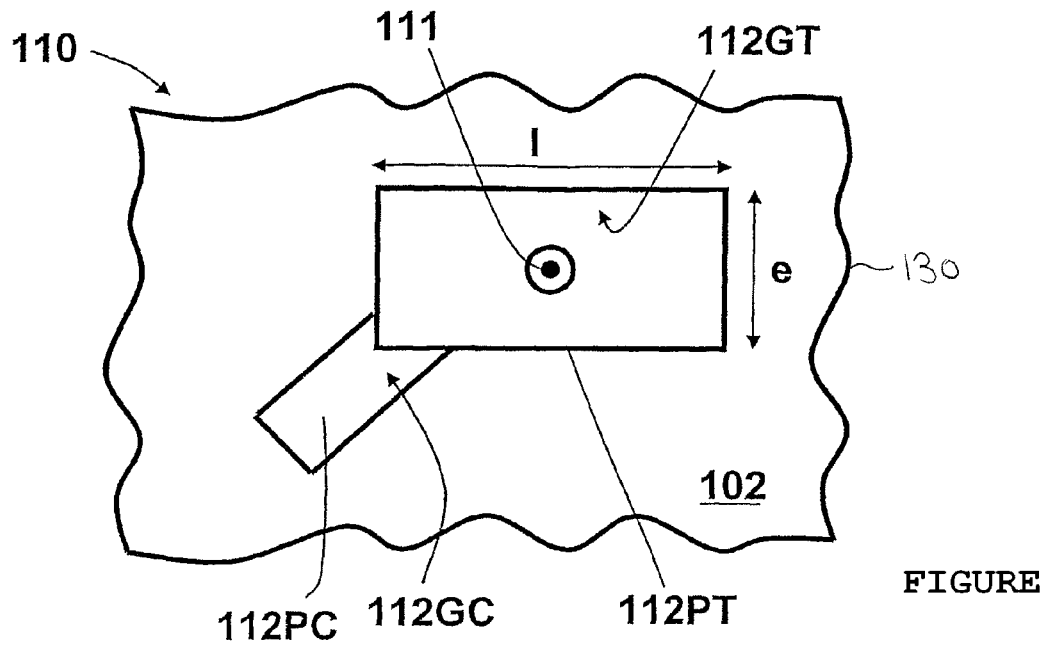
FIGS. 4A, 4B and 5 show schematically an alternative in which the slide has no drive thread, FIG. 4A showing the cutting insert from a bottom view, with its hole, and in FIG. 4B the slide is shown in perspective, and FIG. 5 showing an axial cross-section view of the passage of the cutting insert.
Figure 4B:
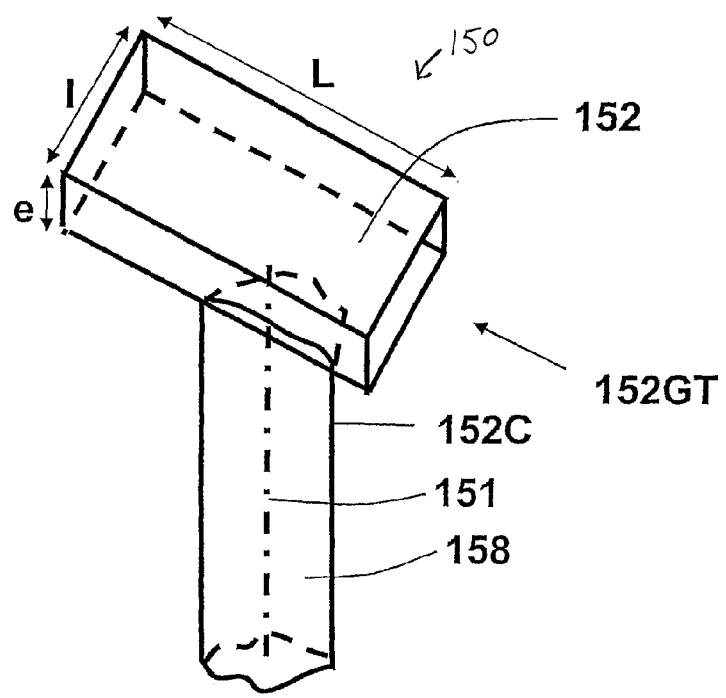
Figure 5:
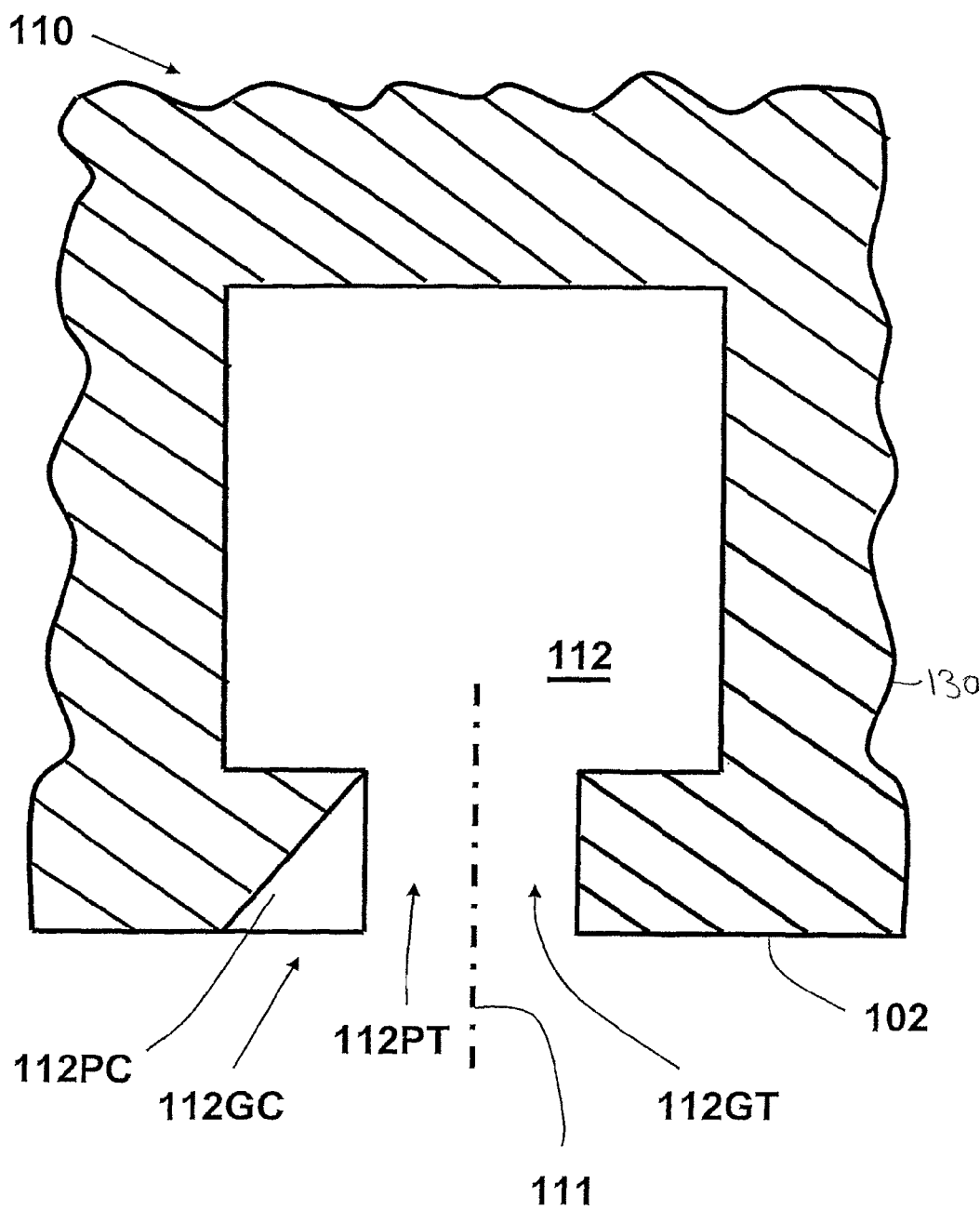

FIGS. 4A, 4B and 5 show schematically an alternative in which the slide does not have a drive thread. The functional elements similar to the functional elements of FIGS. 1-3 have the same references numerals, preceded by the hundred digit "1xx". The cutting insert 110 is seen from below in FIG. 4A, from its lower surface 102, having a head passage 112PT and a neck passage 112PC, leading to a cavity 112 at an intermediate level in its thickness direction. FIG. 5 is an axial cross-section view according to the head passage 112PT.

The overall passage is therefore double, with the head passage 112PT, with a template 112GT, for passing the clamping head 152 and optionally then for housing the neck 152C, said template 112GT being associated with a neck passage template 112GC, for passing the neck 152C. For the simplicity of the description, the head passage template 112GT is in this case rectangular, with sides of respective sizes having respective values 1 and e. The neck passage 112PC corresponds to a slotted flare formed in a limited periphery are of the head passage 112PT.

The clamping head 152 of the slide 150, in the shape of a rectangular parallelepiped, having a length L, a width l and a thickness e, can therefore pass through the head passage 112PT only by having the desired orientation according to three directions of spatial orientation, i.e. with its sides of length L aligned according to a passage axis 111 (thus fixing 2 degrees of rotational freedom), so that one of the small faces, namely end surfaces, of size l×e, having a bulk template compatible with the head template 112GT, can be disposed in front of the passage 112PT. A final rotation (third degree of rotational freedom) about a direction parallel to the passage axis 111 makes it possible to properly fit the clamping head 152 in front of the head passage 112PT, and the neck 152C in front of the neck passage 112PC.

The neck 152C is connected obliquely to the clamping head 152, i.e. starting from the clamping head 152, the neck 152C passes through a virtual plane of extension of the one of said end surfaces that will be introduced last, to the right in FIG. 4A, and the neck 152C merges with the body 158 of the slide. The neck passage template 112GC has the desired width and a flare angle, so that the neck 152C can bring the clamping head 152 into the housing 130 and can cause the clamping head 152 to turn therein in any direction. There can therefore be a final pivoting of the neck 152C from the left flared edge of the additional passage 112PC toward, or in, the head passage 112PT, or there can be a rotation of the neck 152C and the clamping head 152 about the axis 151 of the neck 152C. The neck passage 112PC can also constitute a slot at the actual level of the cavity 112, so that it can thus radially move the clamping head 152 toward a lateral edge of the cavity 112, which thus constitutes a tunnel, as mentioned above.

The clamping head 152 thus constitutes a sort of swivel joint, with a relative pivoting movement in the cavity 112, and this pivoting modifies the bulk template 152GT of the head 152, with respect to the passage direction 111, in order to adapt it or not to the head passage template 112GT and thus release or lock the head 152 and therefore the cutting insert 110.

Of course, the aforementioned rectangular parallelepiped shape of the clamping head 152 is only an example. It is possible in particular to consider a substantially flattened ellipsoid shape having a given size, and to consider a head passage template 112PT of the same size leading to a spherical cavity, for example, thus enabling the swivel joint to be held by relative rotation about the passage axis 111.

Regarding the parasitic screwing due to the heat cycles, identified by this inventor, an explanation is proposed below, in reference to FIGS. 1 to 3.

With the clamping screw 50 first being firmly screwed, the upper flanks 58S, 59S and others, and the threads 58G, 59G and others, are thus in contact with the upper flanks 48S, 49S and others, overhanging them, of the grooves 48, 49 and others, of the thread 40T. During the heating, the clamping screw 50 tends in particular to extend, so that the upper flanks 59S of the threads 59G of the free end segment 58E separate from the upper flank 49S of the opposite groove 49 and move downward, in a purely axial direction, more deeply into the guide hole 40, until the thread abuts the lower flank 49I of the corresponding groove. With the axial extension then being blocked by the lower groove flanks 49I, the purely axial extension force of the clamping screw 50 is exerted increasingly thereon. As the lower flanks 49I constitute a helical ramp, the free end segment 58E is thus twisted, i.e. it continues its downward movement, but helically, into the guide hole 40. The vibrations associated with the operation of the milling cutter 20 can only contribute to the release of the buttressing effect against the lower groove flanks 49I, so that the threads 59G of the free end segment 58E succeed to slide, by jerking with the vibrations, on the opposite lower groove flank 59I, of the down stop.

After stopping the milling cutter 20, which served as a radiator owing to its relatively large surface area, the milling cutter 20 cools more quickly than the cutting insert 10, so that the threads 59G of the free end segment 58E, at the base of the hole 40, farthest from the clamping head 52 which was the heat source, tend rapidly to return to their resting shape, i.e. the threads 59G of the free end segment 58E contract, in particular axially. In consideration of the fact that the cooling wave is propagated only progressively toward the clamping head 52, the threads 59G at various levels of the free end segment 58E have mutual delays for their return to a nominal axial threading step value. This results in a modulation of the local value of the axial threading step according to the axial position considered, which involves an axial pinching of the thread 40T. Indeed, the particular threads 59G that are located at the very end of the free end segment 58E constitute a jaw which was lifted up near or against the associated upper groove flank 49S, while the particular threads 59G of the free end segment 58E that are closest to the clamping head 52 are still abutting the associated lower groove flank 49I.

The free end segment 58E, thus pinching a segment of the thread 40T, therefore does not become unscrewed in order to return to its original position. The upper segment 58T cannot be a driving member, in this aspect, because the apex thread 58G (which is theoretically, due to the axial expansion during the heating, the only one that has maintained a contact with the associated upper groove flank 48S) is in contact only under insufficient pressure with the upper flank 48S. As, on the one hand, the free end segment 58E is thus axially anchored more deeply than desired, and, on the other hand, the upper segment 58T begins to cool, the latter contracts axially. As the upper segment 58T is borne by the free end segment 58E, the aforementioned contraction occurs in a downward movement, toward the free end segment 58E, so that the upper flank 58S of the apex thread 58G of the upper segment 58T temporarily loses its upper contact. This contact, which served to clamp the cutting insert 10, in the axial direction, also prevented any rotational movement, due to a friction coefficient on the upper thread 48S. As this upper contact of the upper segment 58T has disappeared, or was reduced, the upper segment 58T can return to its resting shape, in a cold condition. As the lower end of the upper segment 58T is "supported" by, and integral with, an upper "bearing" end of the anchored free end segment 58E, the upper segment 58T will therefore return to its resting shape, in a cold condition, due to, simultaneously, the axial contraction and a screwing of an angle equal to that which the upper "bearing" end of the free end segment 58E initially turned, by expansion.

The upper end of the free end segment 58E is in fact somewhat virtual, because it has a variable axial and possibly changing position, since it involves the axial level where the support contact, or attachment, occurs of the lower flanks 59I on the lower groove flanks 49I, and this level is dependent on the change in temperature and, in addition, disparities can occur in the coefficient of friction between the various basic surfaces in contact. Finally, as the anchoring of the free end segment 58E disappears with its total cooling, its two ends, upper and lower, respectively, can move toward one another, with a slight unscrewing of the lower end and a slight screwing of the upper end, and therefore also a screwing of the clamping head 52, opposites the axial component of the reaction force of the seat surface 15A.

In short, as the clamping screw 50 progresses along the helical path of the thread 40T, like a caterpillar, the lower segment (58E) extends and becomes attached to the ground, and then attracts the upper segment (58T).

In order to maintain an optimal clamping when the cutting insert 10 increases in temperature, the clamping contact surface 55A and the seat surface 15A forming a ramp are oriented, as shown in FIG. 2, in the clamping position, in a direction cutting the screw axis 51 at the axial point 58A of the plane 58P located at the level of the apex thread 58G, of the apex of the guide segment 58.

Indeed, as the steel clamping screw 50 expands more than the carbide cutting insert 10, and as the guide segment 58 is held axially, the radial plane 58P of the apex thereof is in fact the only one that, under heat, is stationary with respect to the housing 30. Indeed, as explained above, the guide segment 58 will dilate and move downward into the guide hole 40, by coming into a support contact, on the thread 40T, by the upper flank 58S. It is therefore the apex thread 58G that determines (the inclination due to the thread twist being neglected) the position of the stationary radial plane 58P. The external portion of the clamping screw 50, formed by the neck 52C and by the clamping head 52, will therefore tend to expand isotropically with respect to the axial point 58A, i.e. will occupy a homothetic position with respect to the position in the cold condition. As, according to the recommended feature, the ramps mentioned above are oriented according to the local homothetic direction, the clamping contact surface 55A thus slides over the seat surface 15A, without moving away from it, therefore preventing any unclamping, and without increasing the bearing pressure.

The invention claimed is:

1. A clamping assembly, comprising a cutting insert and a clamping device for clamping the cutting insert on a bearing surface provided on a tool holder, which clamping device comprises a slide including a guide segment, intended to be slidably mounted in a guide hole provided in the bearing surface, and a clamping segment including a clamping head comprising a lateral clamping relief with such a shape that it has a clamping contact surface, at least partially turned toward the guide segment, so as to abut an opposite seat surface, associated with a cavity in the cutting insert leading to at least one bearing face of the cutting insert and arranged so as to house the clamping segment, so as to clamp the cutting insert against the bearing surface when the cutting insert and the slide are mutually arranged in a mutually relative clamping position, whereby the cavity of the cutting insert has a passage template, along an access passage for passing the head from the bearing face to the seat surface, the seat surface being associated exclusively with one side of the cavity, wherein the passage template varies according to a suitable shape which is adapted, with respect to a bulk template of the lateral clamping relief, so that the passage template is incompatible with the bulk template when the cutting insert and the slide are arranged in said mutually relative clamping position, and said suitable shape is adapted so that the passage template is compatible with the bulk template when the cutting insert and the slide are arranged in at least one other mutually relative position, for release of the cutting insert, wherein the guide hole is formed in an oblique direction of extension toward a plane of extension of a lateral wall limiting the bearing surface, wherein the cavity has a symmetrical shape with respect to a median plane located at a half-thickness level of the cutting insert, wherein the cavity also leads, through another passage having said passage template, to a face opposite said bearing face and wherein the cavity comprises another seat surface for clamping the cutting insert, which is reversible, in the overturned position.

2. The assembly according to claim 1, in which the passage template and the bulk template are arranged so that said other mutually relative position is reached by tilting the cutting insert with respect to the slide.

3. The assembly according to claim 1, in which the passage template and the bulk template are arranged so that said other mutually relative position is achieved by a relative rotation of the cutting insert with respect to the slide in a plane substantially parallel to the bearing face.

4. The assembly according to claim 3, in which a lateral relief for driving the slide and a complementary relief of the tool holder are arranged so that, by a partial lifting of the slide by at least a given height with respect to the guide hole, the slide pivots over itself by a certain angle that brings the bulk template to an orientation making the bulk template compatible with the passage template.

5. The assembly according to claim 1, in which the passage template and the bulk template are arranged so that said release position is reached by a movement in a plane parallel to the bearing surface of the cutting insert with respect to the slide.

6. The assembly according to claim 1, in which the seat surface extends over a partial peripheral arc of the passage of the cavity.

7. The assembly according to claim 1, in which the lateral wall extends in a generally oblique, flared manner with respect to a normal to the bearing surface.

8. The assembly according to claim 1, in which the guide hole and the slide extend in an arc of circle.

9. The assembly according to claim 1, in which the passage template comprises a constriction segment.

10. The assembly according to claim 1, in which the passage template comprises an enlargement segment.

11. The assembly according to claim 1, in which the guide segment comprises drive control means.

12. The assembly according to claim 1, in which the guide segment comprises a lateral relief, for locking the slide in the clamping position, arranged so as to cooperate with a complementary relief of the tool holder.

13. The assembly according to claim 12, in which the lateral relief for locking the slide in the clamping position is a lateral notch arranged to receive an end, for maneuvering control and position locking, of a maneuvering screw mounted in a threaded hole and arranged to push the slide into the guide hole by contact with a flank of the notch.

14. The assembly according to claim 1, in which the clamping contact surface and the seat surface are two respective ramps arranged for a mutual sliding during the sliding of the slide entering the guide hole, so that a neck segment of the slide, bearing the clamping head, is bent back and received in a lateral recess of the cavity, provided for this purpose on a side opposite the seat surface.

15. The assembly according to claim 14, in which the cavity with the lateral recess together form a housing with a width of at least 1.5 times the width of the clamping head.

16. The assembly according to claim 14, in which the clamping contact surface and the seat surface forming a ramp are oriented, in the clamping position, in a direction cutting a virtual longitudinal axis of the slide at an axial point located substantially in the virtual radial surface of the apex of the guide segment bearing the clamping head.

17. The assembly according to claim 1, wherein the clamping head is cylindrical.

* * * * *